(12) United States Patent
Hans et al.

(10) Patent No.: US 7,899,444 B2
(45) Date of Patent: Mar. 1, 2011

(54) APPARATUS AND METHOD FOR CONTROLLING A TELECOMMUNICATIONS CONFERENCE

(75) Inventors: Martin Hans, Bad Salzdetfurth (DE); Andreas Schmidt, Braunschweig (DE); Norbert Schwagmann, Braunschweig (DE)

(73) Assignee: Infineon Technologies AG (DE)

( * ) Notice: Subject to any disclaimer, the term of this patent is extended or adjusted under 35 U.S.C. 154(b) by 1206 days.

(21) Appl. No.: 11/530,804

(22) Filed: Sep. 11, 2006

(65) Prior Publication Data

US 2007/0121872 A1    May 31, 2007

(30) Foreign Application Priority Data

Sep. 9, 2005    (DE) ................ 10 2005 043 003

(51) Int. Cl.
    *H04M 3/42*  (2006.01)
(52) U.S. Cl. ................. 455/416; 455/518; 370/260; 709/204
(58) Field of Classification Search ........... 455/416, 455/90.2; 370/260; 709/204, 231
    See application file for complete search history.

(56) References Cited

U.S. PATENT DOCUMENTS

| | | | |
|---|---|---|---|
| 5,859,663 A | 1/1999 | Simon | |
| 2003/0153340 A1 | 8/2003 | Crockett et al. | |
| 2003/0236833 A1 | 12/2003 | Glitho et al. | |
| 2004/0047461 A1 | 3/2004 | Weisman et al. | |
| 2005/0088981 A1 | 4/2005 | Woodruff et al. | |
| 2006/0084455 A1* | 4/2006 | Schwagmann et al. | ...... 455/518 |
| 2006/0153352 A1 | 7/2006 | Schmidt et al. | |
| 2006/0178160 A1 | 8/2006 | Hans et al. | |
| 2006/0234613 A1 | 10/2006 | Hans et al. | |
| 2008/0188188 A1* | 8/2008 | Malomsoky et al. | ........ 455/90.2 |
| 2009/0055473 A1* | 2/2009 | Synnergren | ................. 709/204 |
| 2009/0298487 A1* | 12/2009 | Przybysz et al. | ............ 455/416 |

FOREIGN PATENT DOCUMENTS

| | | |
|---|---|---|
| CN | 1611086 A | 4/2005 |
| DE | 10 2005 002 803 B3 | 8/2006 |
| EP | 0 847 178 A2 | 6/1998 |
| EP | 1 001 596 A2 | 5/2000 |
| EP | 1 569 474 A1 | 8/2005 |
| GB | 2 424 147 A | 9/2006 |
| JP | 8298653 A | 11/1996 |
| KR | 2003-0050505 | 6/2003 |
| KR | 10-2004-0001337 | 1/2004 |

(Continued)

OTHER PUBLICATIONS

G. Camarillo et al., XCON Working Group, IETF Internet-Draft, The Binary Floor Control Protocol (BFCP), draft-ietf-xcon-bfcp-02.txt, Oct. 2004, pp. 1-46 http://www.softarmor.com/wgdb/docs/draft-ietf-xcon-bfcp-02.txt.

(Continued)

*Primary Examiner*—Creighton Smith
(74) *Attorney, Agent, or Firm*—Dickstein Shapiro LLP

(57) ABSTRACT

Communications right allocation information is additionally contained within a telecommunications conference control message, the allocation information specifying an event on whose occurrence a communications right is withdrawn from or allocated to the telecommunications terminal within the scope of the telecommunications conference.

40 Claims, 8 Drawing Sheets

FOREIGN PATENT DOCUMENTS

| WO | WO-99/03253 | 1/1999 |
| --- | --- | --- |
| WO | WO-02/098015 A1 | 12/2002 |
| WO | WO-03/003157 A2 | 1/2003 |
| WO | WO-03/036801 A2 | 5/2003 |
| WO | WO-2005/064849 A1 | 7/2005 |
| WO | WO-2005/064961 A1 | 7/2005 |

OTHER PUBLICATIONS

Open Mobile Alliance, PoC User Plane Version 1, Draft Version 1.0, OMA-TS_PoC-UserPlaneV1_0-20041117-D, Nov. 2004.

H. Schulzrinne et al., Network Working Group, IETF Request for Comments for RFC 3550, RTP: A Transport Protocol for Real-Time Applications, Jul. 2003, pp. 1-92 http://www.ietf.org/rfc/rfc3550.txt.

J. Rosenberg et al., SIPPING Internet-Draft, A Session Initiation Protocol (SIP) Event Package for Conference State, draft-ieft-sipping-conference-package-06.txt, Oct. 2004 http://tools.ietf.org/wg/sipping/draft-ietf-sipping-conference-package/draft-ietf-sipping-conference-package-06.txt.

J. Rosenberg et al., Internet Engineering Task Force, IETF Internet Draft, A Framework for Conferencing with the Session Initiation Protocol, draft-ietf-sipping-conferencing-framework-00.txt, May 2003 http://tools.ietf.org/wg/sipping/draft-ietf-sipping-conferencing-framework/draft-ietf-sipping-conferencing-framework-00.txt.

Open Mobile Alliance, Push to talk over Cellular (PoC)—Architecture, Candidate Version 1.0, OMA-AD_PoC-V1_0-2-20050428-C, Apr. 2005.

State Intellectual Property Office, P.R. China, Chinese Office Action issued for Patent Appl No. 200610147010.3, dated Jun. 12, 2009.

* cited by examiner

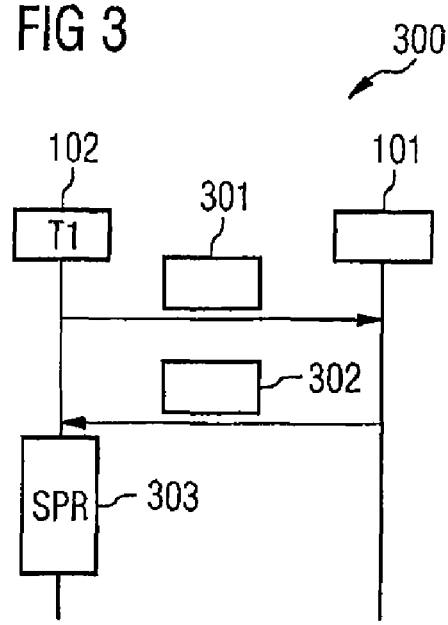
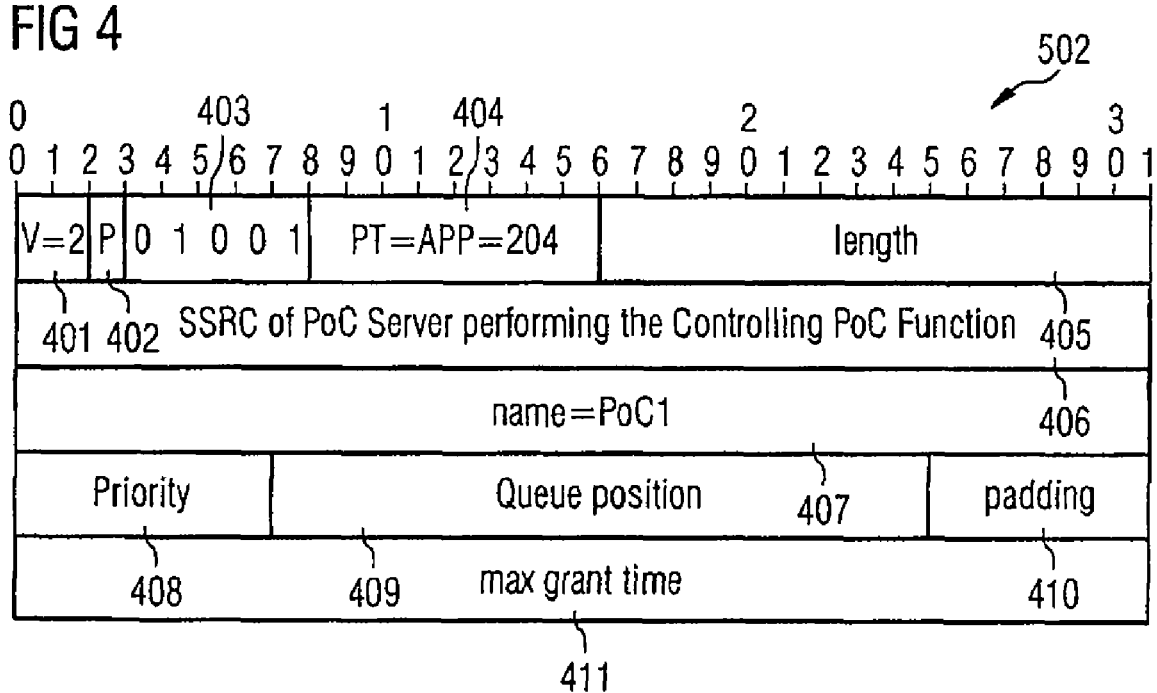

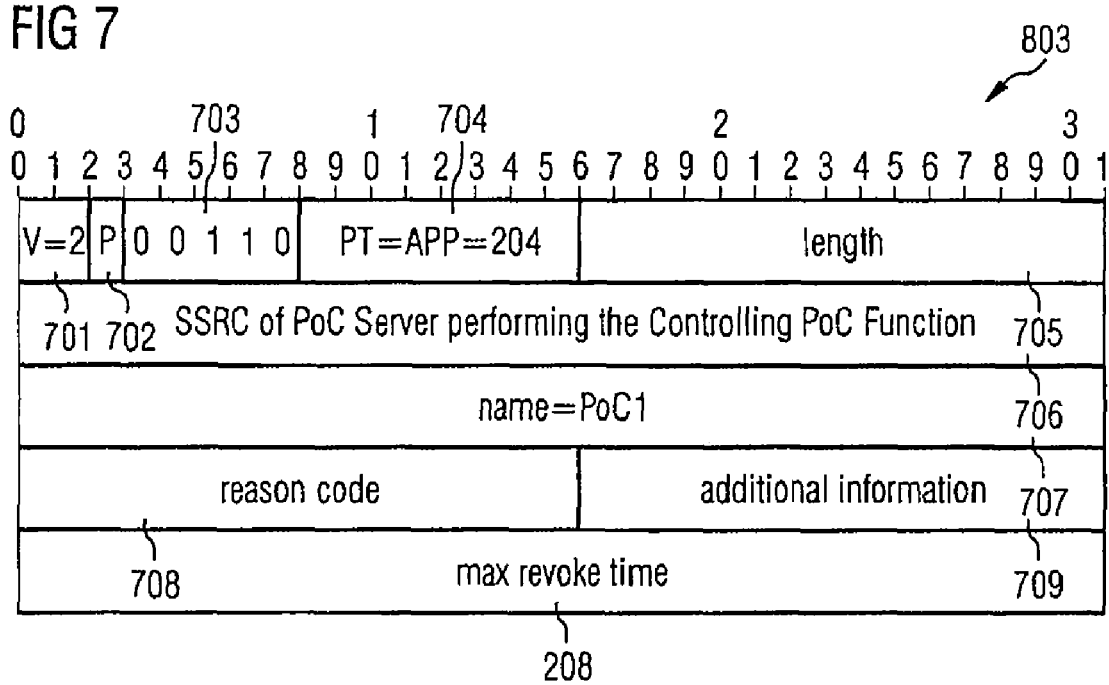
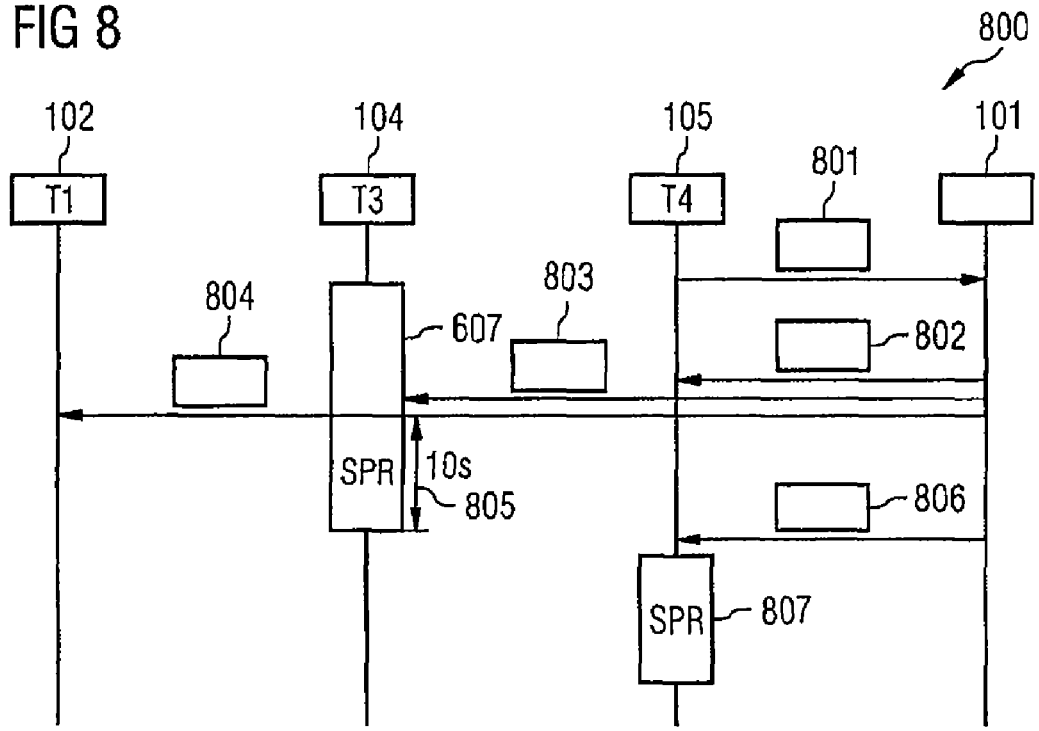

APPARATUS AND METHOD FOR CONTROLLING A TELECOMMUNICATIONS CONFERENCE

CROSS-REFERENCE TO RELATED APPLICATION

This application claims priority to German Patent Application Serial No. 10 2005 043 003.1-42, which was filed on Sep. 9, 2005, and is incorporated herein by reference in its entirety.

BACKGROUND OF THE INVENTION

The invention relates to a telecommunications conference server, a telecommunications terminal, a method of generating a telecommunications conference control message, a method of controlling a telecommunications conference, computer-readable storage media and computer program elements.

SUMMARY OF THE INVENTION

In accordance with an exemplary embodiment of the invention, a telecommunications conference server unit is provided that has a telecommunications conference control unit performing server control of a telecommunications conference. Furthermore, the telecommunications conference server unit has a telecommunications conference control message-generating unit for generating at least one telecommunications conference control message, the telecommunications conference control message-generating unit being configured to add communications right allocation information to the telecommunications conference control message, the communications right allocation information specifying the event on whose occurrence a communications right is withdrawn from or allocated to the telecommunications terminal within the scope of the telecommunications conference.

These and other features of the invention will be better understood when taken in view of the following drawings and a detailed description.

BRIEF DESCRIPTION OF THE DRAWINGS

Exemplary embodiments of the invention are illustrated in the figures and will be explained in more detail below.

FIG. 3 is a message flowchart according to an exemplary embodiment of the invention.

FIG. 4 shows a format of an RTCP message according to another exemplary embodiment of the invention.

FIG. 7 shows a format of an RTCP message according to another exemplary embodiment of the invention.

FIG. 8 is a message flowchart according to an additional exemplary embodiment of the invention.

DESCRIPTION OF THE INVENTION

Figure 1:
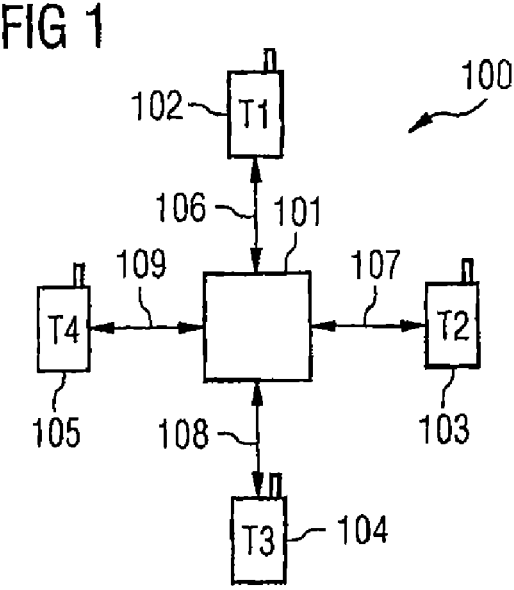
FIG. 1 is a block diagram of a telecommunications conference system according to an exemplary embodiment of the invention.

As used herein the terms connected and coupled are intended to include both direct and indirect connection and coupling, respectively. In the figures, identical or similar elements are designated by identical reference numbers, if appropriate.

In a conference system, the right to communicate (communications right) is usually checked by means of a communications right assignment mechanism. Within the scope of this mechanism, the subscriber requests a communications right from a telecommunications conference server, and the server authorizes the right or does not authorize it. If the server does not authorize the right, it can authorize it at a later time. The subscriber does not learn about the authorization until the time of authorization so that he cannot prepare himself for it in advance. Likewise, the communications right can be withdrawn from the subscriber again, and the subscriber cannot prepare himself in advance for the fact that the communications right is withdrawn from him since he is not informed of this until the time of withdrawal of the communications right.

Conference systems generally permit a plurality of users to communicate with one another using communications devices.

In order to permit orderly communication, the right to communicate over a specific medium (for example audio, video, text) is usually not granted to all the subscribers to a conference at the same time. The communications rights are instead usually assigned according to specific predefined rules. The assignment of communications rights is also referred to as floor control and the assignment rules, for example in an Internet-based conference system according to an Internet conferencing framework defined by the IETF (Internet Engineering Task Force), are referred to as floor policy.

In a large conference room, for example a conference system is used which makes available microphones and loudspeakers for voice communication to the subscribers. The microphones have to be switched on for use by the respective speaker. The switched-on microphone shuts off all the other microphones so that only one speaker can ever be active. A further microphone (for example the microphone of the conference chair) can exceptionally also be active at the same time. The right to speak is therefore always assigned to just one subscriber and possibly to the conference chair.

A comparable service already exists for mobile radio telephones (push-to-talk services, PTT, for example the "Direct Connect" service from Nextel in the USA or push-to-talk-over-cellular (PoC) from the Open Mobile Alliance (OMA)). As in a walkie-talkie, the speaker usually activates a special key on the mobile radio telephone in order to transmit messages. The transmission of messages by other users is blocked during this time. In a conference system according to a proposal by the IETF, communications rights are controlled by the so-called Binary Floor Control Protocol (BFCP).

In a push-to-talk system which is customary to date, communications rights are requested and assigned by means of the so-called Real-Time Transport Control Protocol (RTCP). Alternatively, communications rights could also be controlled by means of BFCP.

In such a push-to-talk communications system it is possible to request communications rights with a specific priority. Requests for the higher priority may be approved.

The subscriber at a conference can be informed about the state of the conference by a so-called notification. Thus, for example, the subscribers can be informed which subscriber requests the right to speak for a specific medium. Notifications are conveyed in an IETF-based conference system, usually by means of the so-called Session Initiation Protocol (SIP). In a current push-to-talk system, the RTCP is used to notify the subscribers which subscriber the right to speak has been allocated to.

A conference system according to the IETF conferencing framework or a conference system according to a push-to-talk service has a centralized architecture. This means that the subscribers to such a conference system do not communicate directly with one another but rather over a central server. In a mobile communications system, the central server is located in the non-mobile part of the communications network.

In accordance with one embodiment of the invention, a telecommunications conference server unit has a telecommunications conference control unit for performing server control of a telecommunications conference. In addition, a telecommunications conference control message-generating unit is provided for generating at least one telecommunications conference control message, the telecommunications conference control message-generating unit being configured to add communications right allocation information (for example right to speak allocation information) to the telecommunications conference control message, the communications right allocation information specifying the event on whose occurrence a communications right is withdrawn from or allocated to the telecommunications terminal within the scope of the telecommunications conference.

In accordance with one embodiment of the invention, a telecommunications terminal has a telecommunications conference control unit for performing terminal control of a telecommunications conference as well as a receiver unit for receiving at least one telecommunications conference control message. In addition, a determining unit is provided which is configured to determine communications right allocation information from the at least one telecommunications conference control message, the communications right allocation information specifying the event on whose occurrence a communications right is withdrawn from or allocated to the telecommunications terminal within the scope of the telecommunications conference.

In a method of generating a telecommunications conference control message, control information for controlling a telecommunications conference is added to the telecommunications conference control message. In addition, communications right allocation information is added to the telecommunications conference control message, the communications right allocation information specifying the event on whose occurrence a communications right is withdrawn from or allocated to the telecommunications terminal within the scope of the telecommunications conference.

In a method of performing terminal control of a telecommunications conference, control information for controlling a telecommunications conference is determined from a telecommunications conference control message which is received within the scope of the telecommunications conference. In addition, communications right allocation information which is contained in the received telecommunications conference control message is obtained from it. The communications right allocation information specifies the event on whose occurrence a communications right is withdrawn from or allocated to the telecommunications terminal within the scope of the telecommunications conference.

Computer-readable storage media have computer programs which, when they are executed by a processor, have the respective features described above.

In addition, computer program elements are provided which, when executed by means of a processor, have the features described above.

In one embodiment of the invention a telecommunications terminal is informed, within the scope of the telecommunications conference, of the event on whose occurrence a not yet granted communications right is assigned to the telecommunications terminal, or a granted communications right is withdrawn from it.

In this way it is possible for a subscriber who has requested a communications right within the scope of a telecommunications conference to be informed in advance, i.e. before receipt of the communications right, as to when he will probably receive the communications right. Correspondingly, it is advantageously made possible for a subscriber who has already had a communications right allocated to him to be informed at an early time as to when the communications right will (probably) be withdrawn from the subscriber again.

Owing to the transmission and, if appropriate, display of the communications right allocation information it is made possible for a subscriber already to be informed about approval or withdrawal of a communications right before it occurs so that he can prepare himself for the approval or the withdrawal of the communications right.

The embodiments of the invention which are described below relate, in so far as they are appropriate, to the telecommunications conference server unit, the telecommunications terminal, the method for generating a telecommunications conference control message, the method for controlling a telecommunications conference and the computer-readable storage media and the computer program elements.

Embodiments of the invention can be used in any desired telecommunications conference system. The use of the invention is particularly advantageous within the scope of a half-duplex telecommunications conference, in which case, according to this embodiment of the invention, the telecommunications conference control unit of the telecommunications conference server unit is configured to perform server control of a half-duplex telecommunications conference.

The communications right can be a right to speak (i.e. the right to introduce speech data into the conference), alternatively or additionally a multimedia data communications right, i.e. the right to introduce multimedia data, for example speech data, video data, still image data, textual data etc. into the conference).

In addition, the telecommunications conference control message-generating unit can be configured to add, as communications right allocation information, information specifying the period after which a communications right is withdrawn from or allocated to the telecommunications terminal within the scope of the telecommunications conference.

A half-duplex telecommunications conference is generally understood to be any telecommunications conference in which a communications right is respectively allocated to a maximum one subscriber to the telecommunications conference, i.e. a maximum one subscriber to the telecommunications conference can transmit messages into the telecommunications conference, and all the other subscribers to the telecommunications conference function in this case as receivers and thus do not themselves have any communications right and cannot transmit any messages, for example any speech messages, into the telecommunications conference and thus to other subscribers to the telecommunications conference.

A communications right is generally understood to be the right to transmit, as a subscriber to a communications conference, any desired types of communications data to other subscribers to the telecommunications conference. In a telecommunications conference, the data can be multimedia data, for example audio data, video data, still image data, textual data etc. If audio data is transmitted within the scope of the telecommunications conference, the communications right is also referred to below as right to speak for the respective subscriber.

According to one embodiment of the invention there is provision for the telecommunications conference control message-generating unit to be configured to add, as communications right allocation information, information which specifies the period after which a communications right is withdrawn or allocated to the telecommunications terminal within the scope of the telecommunications conference.

The indication and possible display of a time period makes it easily possible for a user, i.e. a subscriber to the conference, for example a user of a telecommunications terminal, to quickly comprehend when he will probably have the right to speak, generally the communications right, granted to him, or when he must expect to have it withdrawn from him.

Alternatively, an indirect chronological indication with a certain degree of imprecision may also be provided, for example an indication of position in a queue, which indicates the position in a telecommunications conference queue at which the request for the communications right has been buffered, in more general terms has been arranged. In other words, the subscriber can thus be informed, and it can if appropriate be displayed to him, how many subscribers will have the communications right allocated to them with a chronological restriction (in addition optionally with an indication of the period for which the respective subscriber will have the communications right allocated to him), and thus the assumed time at which the subscriber requesting the communications right can expect to have the communications right allocated to him.

The chronological information can either be absolute, in which case the designation an absolute time indication refers to an absolute time and/or date, if appropriate with an additional indication of the respective time zone, or a relative time indication, the designation relative time indication referring to a time period which contains the communications right allocation information, referred for example to the time when the telecommunications conference control message is dispatched.

The telecommunications conference control unit may be configured to perform server control of an Internet-based telecommunications conference, for example a telecommunications conference according to the Internet-based IETF conferencing framework.

In an alternative embodiment of the invention, the telecommunications conference control unit can be configured to perform server control of a push-to-talk telecommunications conference, for example of a push-to-talk-over-cellular telecommunications conference or of a "direct connect" telecommunications conference from Nextel in the USA or a similar system.

The telecommunications conference control message-generating unit is configured, according to one embodiment of the invention, to generate the at least one telecommunications conference control message according to the telecommunications conference control protocol, for example according to one of the following telecommunications conference control protocols:
    Session Initiation Protocol (SIP),
    Real-Time Transport Control Protocol (RTCP),
    Binary Floor Control Protocol (BFCP).

Furthermore, the telecommunications conference control unit can be configured in such a way that the withdrawal or the allocation of a communications right is carried out implicitly by means of the telecommunications conference control message by the communications right being withdrawn or allocated if the event specified by the communications right allocation information contained in the telecommunications conference control message has occurred.

The telecommunications conference control message-generating unit can be configured to receive at least one telecommunications conference withdrawal/allocation event interrogation message for interrogating the withdrawal event or the allocation event and for generating a telecommunications conference withdrawal/allocation event message in response to the reception of a telecommunications conference withdrawal/allocation event interrogation message.

According to one embodiment of the invention, the determining unit in the telecommunications terminal is configured to determine communications right allocation information from the at least one telecommunications conference control message, the communications right allocation information specifying the time at which a communications right is withdrawn from or allocated to the telecommunications terminal within the scope of the telecommunications conference.

In addition, the telecommunications terminal can have a reproduction unit for reproducing the communications right allocation information which is determined, for example the right to speak allocation information. The reproduction unit may be an audio reproduction unit, for example a loudspeaker, or a visual reproduction unit, for example a screen, of the telecommunications terminal.

The telecommunications conference control unit of the telecommunications terminal is, according to another embodiment of the invention, configured to perform terminal control of a half-duplex telecommunications conference, for example of one of the half-duplex telecommunications conferences described above, and thus, for example, for performing terminal control of an Internet-based telecommunications conference, for example according to the Internet-based conferencing framework, or performing terminal control of a push-to-talk telecommunications conference, for example a push-to-talk-over-cellular telecommunications conference.

The determining unit of the telecommunications terminal can be configured to determine communications right allocation information, for example right to speak allocation information from the at least one telecommunications conference control message according to a telecommunications conference control protocol, for example according to one of the following telecommunications conference control protocols:
    Session Initiation Protocol (SIP),
    Real-Time Transport Control Protocol (RTCP),
    Binary Floor Control Protocol (BFCP).

In addition, the telecommunications terminal can have a right to speak allocation information updating unit for updating right to speak allocation information, generally communications right allocation information, as a function of a received telecommunications conference control message. In other terms, according to this embodiment of the invention there is provision for communications right allocation information which is transmitted to a telecommunications terminal to be updated owing to changing peripheral conditions by means of new communications right allocation information. For example, it is thus possible to take into account the fact that a subscriber to a telecommunications conference does not use his communications right for the entire duration for which the communications right has been allocated to him, and thus already gives up the communications right at an early time, that as a result a later subscriber, i.e. a subscriber for which there has been provision for him to have the communications right allocated to him at a later time to be informed that he will now (probably) already have the communications right allocated to him somewhat earlier.

Correspondingly it is possible to provide that if a subscriber to a telecommunications conference has applied for a communications right and has received a nonbinding prediction about when he will probably have the communications right assigned to him but in the meantime, before the communications right is granted, another subscriber or a plurality of other subscribers with a higher priority with respect to the allocation of a communications right request a communications right and thus possibly have a communications right allocated to them before the respective subscriber, the respective subscriber is informed about his delayed, in other words later, allocation of the communications right.

Furthermore, the telecommunications conference control unit of the telecommunications terminal is configured in such a way that the withdrawal or the allocation of a communications right takes place automatically if the event specified by the communications right allocation information contained in the telecommunications conference control message has occurred.

As a result, in accordance with one embodiment of the invention, in a communications system with communications right control (for example in a push-to-talk system or in an Internet-based conference system), subscribers who have requested a communications right in advance (i.e. before receipt of the communications right) are informed as to when they acquire the communications right or when it is respectively withdrawn from them, by the rejection messages, approval messages and withdrawal messages of the communications right control also including information indicating after what period of time the communications right will at the latest be approved or withdrawn.

If a subscriber has requested a communications right from a server unit and the server unit provisionally rejects the request, the server unit can, together with its rejection, indicate to the subscriber a period of time after which it will at the latest approve the request. In addition it is possible to provide that when the server unit approves a request it accompanies its approval with information to the telecommunications terminal indicating the time period after which it will at the latest withdraw the communications right again.

If the server unit withdraws a communications right from a subscriber early, it can accompany the withdrawal message with information to the telecommunications terminal indicating a time period after which it will withdraw the communications right.

The time periods which have been signalled to a terminal, generally the respective events on whose occurrence a communications right is withdrawn or granted, can be indicated by the terminal. The indication can occur once or repeatedly or continuously directly after the communication of the time period, generally of the event. If the time periods change (or if the event changes), for example because the communications right can be assigned earlier because the last speaker has ended his contribution early, the new time periods (generally the new events) can be signalled to the terminal again by the server unit.

For example, a queue position indication can be updated and communicated to a subscriber, or his telecommunications terminal waiting for the communications right, if, for example, a request which is arranged in the queue is retracted by a subscriber to the conference, and is thus deleted from the queue, without the communications right having been assigned to the respective subscriber.

The time periods can also be signalled independently of the communications right commands by notification, for example by means of the session initiation protocol.

The time periods can also be signalled by the subscriber terminal independently of the communications right command according to specific requests.

According to another configuration of the invention, the telecommunications conference server unit has a communications right event message-generating unit for generating at least one telecommunications conference event message which indicates the event owing to which the communications right was withdrawn or allocated.

The communications right event message-generating unit can be configured to generate the telecommunications conference event message according to one of the following telecommunications conference control protocols:
Session Initiation Protocol (SIP),
Real-time Transport Control Protocol (RTCP),
Binary Floor Control Protocol (BFCP).

In addition, the communications right event message can be configured as at least one of the following messages:
as a message with which the communications right is granted when RTCP is used, for example, as a "Talk_Burst_Granted" message,
as a message with which the communications right is withdrawn when RTCP is used, for example, as a "Talk_Burst_Revoke" message,
with a message with which status information about the status of a communications right assignment queue is communicated when RTCP is used, for example, as a "Talk_Burst_Request_Queue_Status" message.

An advantage of one embodiment of the invention is that a subscriber who has requested the communications right, for example the right to speak, can use the time up to his contribution in some other way. Thus, he can, for example, prepare himself for his contribution during this time. Before his contribution is ended, a communications right of using subscribers, for example a speaking subscriber, can end his contribution before the right to speak is abruptly withdrawn from him, before he has arrived at an appropriate end of his contribution. The tracking of remaining time up to communications right approval or communications right withdrawal by the subscriber terminal has, for example, the advantage that the remaining time can be displayed repeatedly to the user without this information having to be transmitted repeatedly from the server unit to the subscriber terminal.

If, after notification of communications right approval or communications right withdrawal, the communications right approval or the communications right withdrawal is no longer communicated at the time of the approval or withdrawal, this has the advantage that despite the notification it is not necessary to transmit more messages than without the notification.

According to another refinement of the invention, the telecommunications terminal has a telecommunications conference withdrawal/allocation event interrogation message-generating unit for generating at least one telecommunications conference withdrawal/allocation event interrogation message for interrogating the withdrawal event or the allocation event. The telecommunications conference withdrawal/allocation event interrogation message is transmitted, for example, to the telecommunications conference server unit and the telecommunications conference server unit generates and determines a telecommunications conference event message which specifies the event owing to which the communications right was withdrawn or allocated, and transmits said message to the telecommunications terminal.

FIG. 1 shows a telecommunications conference system 100 according to an exemplary embodiment of the invention. The telecommunications conference system 100 is configured according to the push-to-talk-over-cellular (PoC) according to the standard of the Open Mobile Alliance (OMA), the individual components being additionally configured in such a way that they can carry out the methods and communications protocols described below. In this context it is to be noted that the architecture described in FIG. 1 for the telecommunications conference system 100 is identical for all the exemplary embodiments described below.

The telecommunications conference system 100 has a central push-to-talk-over-cellular server unit 101 (PTT server) as well as a multiplicity of mobile radio communications terminal, for example mobile radio telephones, 102, 103, 104, 105, the mobile radio communications terminals 102, 103, 104, 105 each containing a push-to-talk-over-cellular client unit which is configured for communication according to the push-to-talk-over-cellular communications standard. The mobile radio communications terminals 102, 103, 104, 105 are coupled to the PTT server 101 over a respective air interface by means of a respective radio communications link 106, 107, 108, 109. As a result, the subscribers, and thus the users of the mobile radio communications terminals 102, 103, 104, 105, do not communicate directly with one another but rather by means of the central PTT server 101.

According to this exemplary embodiment of the invention, it is assumed, in a simplifying fashion, that four subscribers and thus four mobile radio communications terminals 102, 103, 104, 105 participate in a push-to-talk-over-cellular communications session (also referred to below as PTT session). The subscribers communicate by means of audio, i.e. by means of speech, in which case, according to the half-duplex method, a respective subscriber is respectively allocated a communications right on an exclusive basis, this being a right to speak according to this exemplary embodiment of the invention, by the PTT server 101.

The allocation of the right to speak, generally the communications right and thus the communications right control is carried out at the PTT server 101 by means of messages according to the communications protocol real-time transport control protocol (RTCP) according to the OMA communications standard. Requested communications rights are stored in a queue which is implemented in a memory of the PTT server 101. The subscribers, i.e. the subscriber who is respectively allocated the communications right, are allowed to transmit speech sections with a maximum length of 60 seconds per approved communications right, in other words with the allocation of a communications right each subscriber is allocated a time slot of 60 seconds in which he can transmit speech data to the other subscribers to the communications conference without other subscribers being able to interrupt him.

During this time, the other subscribers cannot introduce any data into the telecommunications conference, i.e. they do not receive a communications right.

According to these exemplary embodiments of the invention, it is assumed that the PTT session has just been started, and the radio communications links 106, 107, 108, 109 have thus just been set up. In addition, it is assumed that no subscriber has yet had the communications right allocated to him.

As a result, there is still no subscriber speaking within the scope of this telecommunications conference which has been set up. A first subscriber T1, according to this exemplary embodiment the user of the first mobile radio communications terminal 102, is, according to this exemplary embodiment of the invention, the first to request the right to speak from the PTT server 101 by means of a "Talk_Burst_Request" message 301, as is illustrated in the message flow chart 300 in FIG. 3. The expression "Talk_Burst" is abbreviated below to "TB". The PTT server 101 approves the request and communicates it to the first mobile radio communications terminal 102 and thus to the first subscriber T1 by means of a "TB_Granted" message 302 which is generated by the PTT server 101 and transmitted to the first mobile radio communications terminal 102. The communication between the subscribers and thus between the mobile radio communications terminals 102, 103, 104, 105 and the PTT server 101 takes place within the scope of the process of controlling the telecommunications conference by means of an RTCP message.

Figure 2:
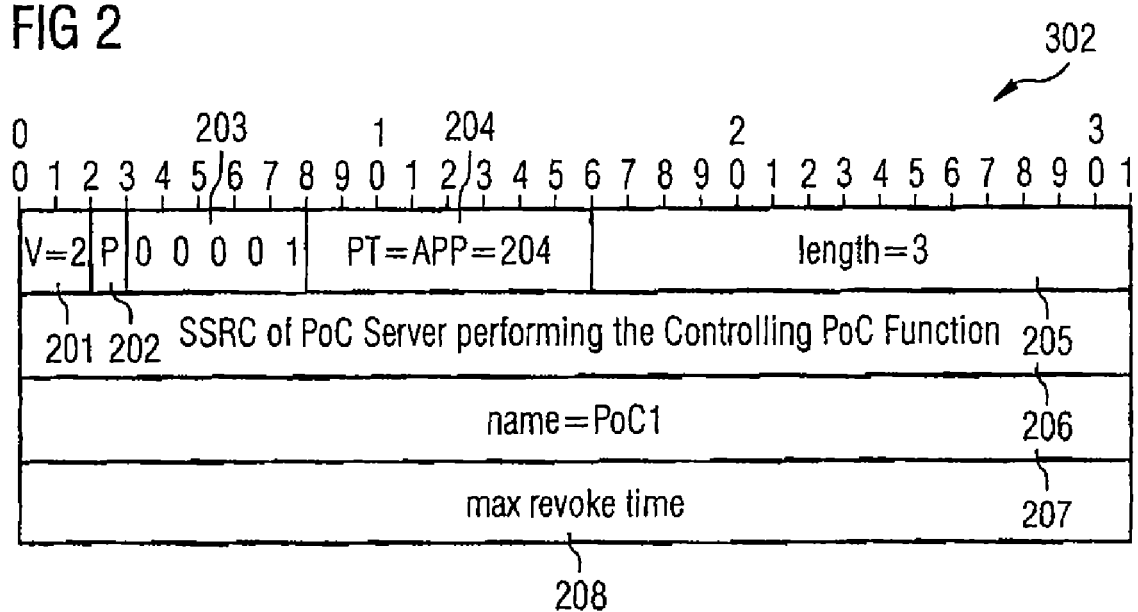
FIG. 2 shows the format of an RTCP message according to an exemplary embodiment of the invention.

The "TB_Granted" message 302 is illustrated in detail in FIG. 2.

The RTCP message "TB_Granted" 302 has the following message fields:

a version number field V 201:
  an RTP version number (according to this exemplary embodiment V=2);
a padding field P 202:
  an indicator for padding;
a subtype field 203:
  a subtype of the message, according to this exemplary embodiment filled with "00001", which designates the type of the message "TB_Granted";
a packet type field 204:
  an indicator of an applications-defined RTCP message; according to this exemplary embodiment

PT=APP=204;

a message length field 205:
  an indication of the length of the message according to the message length field in words (32 bits); if the value "3" is entered in the message length field the message is a "TB_Granted" message with a time indication contained in it; if the message length field contains the value "2", the message is a "TB_Granted" message without a time indication, as is described above in the communications protocol real-time transport control protocol (RTCP) according to the OMA communications standard;
an SSRC field 206:
  an indication of the synchronization source of the PTT server; the SSRC identifies the transmitter of media flows unambiguously; it is defined in the RTP packets associated with the RTCP message;
a message name field 207:
  an applications-defined message name; according to this exemplary embodiment PoC1, this indication meaning that the message is an applications-defined message of a version 1 Push-to-Talk-over-Cellular system; and
a time period field 208:
  an indication of a time period in milliseconds (alternatively in seconds, microseconds or any desired predefined time intervals, alternatively as an absolute time indication) up to the latest time when the communications right is withdrawn (also referred to in FIG. 2 as in "max revoke time").

As a result, the time period field 208 of the "TB_Granted" message 302 contains a time indication which indicates the latest time from which the right to speak will be withdrawn again from the first subscriber T1. According to this exemplary embodiment of the invention, 60 seconds are entered as the time period.

In FIG. 3, the time period for which the first subscriber T1 and thus the first mobile radio communications terminal 102 is allocated the right to speak is illustrated in a block 303. The right to speak is withdrawn again from the first mobile radio communications terminal 102 at the latest after the time period of 60 seconds.

During this time, the first mobile radio communications terminal 102 transmits speech data to the PTT server 101 and via it to the other subscribers of the telecommunications conference session.

Figure 5:
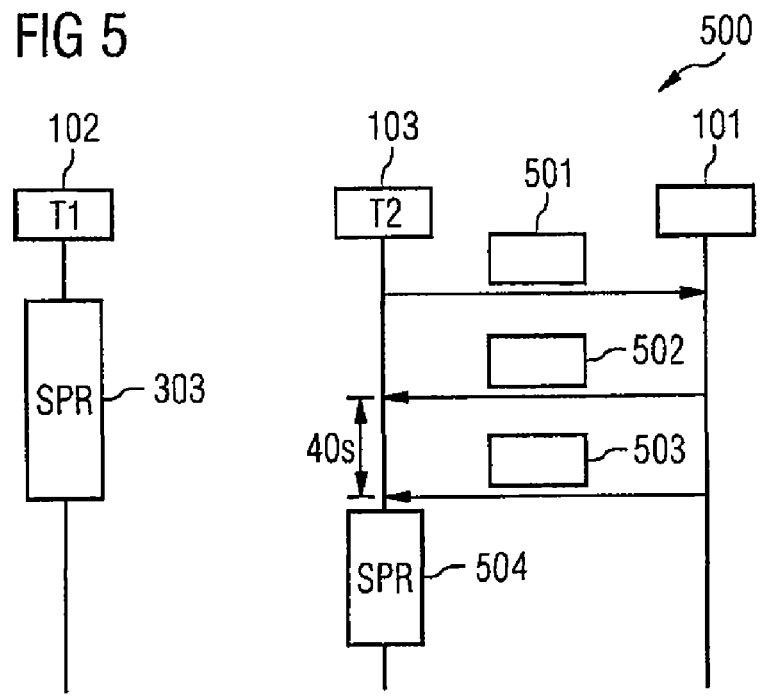
FIG. 5 is a message flowchart according to another exemplary embodiment of the invention.

As is illustrated in a second message flowchart 500 in FIG. 5, it is now assumed that while the first subscriber T1 is speaking and while the first mobile radio communications terminal 102 has had the right to speak assigned to it, a second subscriber T2, according to this exemplary embodiment of the invention the user of the second mobile radio communications terminal 103, also requests the right to speak. This is done by means of a "TB_Request" message 501 which is generated by the second mobile radio communications terminal 102 and transmitted to the PTT server 101.

Since at this time the first mobile radio communications terminal 102 currently has the right to speak granted to it and the first subscriber T1 is currently speaking and his maximum speaking time has not yet expired, the PTT server 101 does not approve the right to speak immediately for the second subscriber T2. It communicates this to the second subscriber or to the second mobile radio communications terminal 103 by means of a "TB_Request_Queue_Status" message 502 which the PTT server 101 generates and communicates to the second mobile radio communications terminal 103. The "TB_Request_Queue_Status" message 502 contains a time indication of the latest time from when the second subscriber T2 has the right to speak allocated to it. In this example, the maximum remaining speaking time by the first subscriber T1 is entered as the time, 40 seconds according to this exemplary embodiment of the invention.

The format of the "TB—Request_Queue_Status" message 502 for rejecting the requested right to speak is illustrated in FIG. 4. FIG. 4 shows the RTCP message "TB_Request_Queue_Status" message 502 for temporarily rejecting the communications right with an indication of the maximum time period up to the approval of the communications right in detail.

The RTCP message 502 has the following message fields:
a version number field V 401:
    an RTP version number (according to this exemplary embodiment V=2);
a padding field P 402:
    an indicator of padding information;
a subtype message field 403:
    a subtype of the message, where "01001" identifies the message "TB_Request_Queue_Status" according to this exemplary embodiment of the invention;
a packet type field 404:
    an indicator of applications-defined RTCP message; PT=APP=204 according to this exemplary embodiment of the invention;
a message length field 405:
    an indication of the length of the message according to the message length field in words (32 bits); if the value "4" is entered in the message length field the message is a "TB_Request_Queue_Status" message with a time indication; if the field contains the value "3" the message is a "TB_Request_Queue_Status" message without a time indication, as is defined in the communications protocol real-time transport control protocol (RTCP) according to the OMA communications standard;
a SSRC field 406:
    a synchronization indication of the source of the PTT server which transmits the rejection; the SSRC identifies the transmitter of media flows unambiguously; it is defined in the RTP packets which are associated with the RTCP message;
a message name field 407:
    an applications-defined message name: according to this exemplary embodiment of the invention PoC1, which identifies a version 1 Push-to-Talk-over-Cellular system;
a priority field 408:
    an indication of the priority with which the communications right request is handled, a higher priority value designating a higher priority;
a queue position field 409:
    an indication of the number of communications rights requests which are stored in the queue of the PTT server 101 before the request by the informed subscriber, and are thus positioned in front of it and are processed before it;
a padding field 410:
    this field contains padding data; and
a time field 411:
    a time period in milliseconds (alternatively in seconds, microseconds or any desired predefined time intervals, alternatively as an absolute time indication) of the latest time up to which the communications right is allocated to the second mobile radio communications terminal 103 (also referred to by "max grant time" in FIG. 4).

While the first subscriber T1 is speaking, and the first mobile radio communications terminal 102 has thus had the right to speak allocated to it, his remaining talk time is displayed continuously on his mobile radio communications terminal 102 by means of his display unit.

According to this exemplary embodiment of the invention, it is assumed that the first subscriber T1 will summarize his contribution once more in a last sentence 10 seconds before the end of the speaking time. The right to talk (right to speak) is then withdrawn from the first subscriber T1 and thus from the first mobile radio communications terminal 102 (cf. FIG. 5).

According to this embodiment of the invention it is not necessary for the withdrawal of the right to speak to be communicated to the first subscriber T1 or to the first mobile radio communications terminal 102 separately by means of the PTT server 101.

After the right to talk has been withdrawn from the first subscriber T1 and thus from the first mobile radio communications terminal 102, a right to talk is approved for the second subscriber T2 and thus for the second mobile radio communications terminal 103, in other words is allocated thereto, by means of a "TB_Granted" message 503 which is generated by the PTT server 101 and transmitted to the second mobile radio communications terminal 103. According to this exemplary embodiment of the invention, a time period of 60 seconds is again communicated as a maximum speech time to the second mobile radio communications terminal 103, and it is to be noted here that in alternative embodiments of the invention different time periods can be indicated, if appropriate as a function of the priority of the respective subscriber within the telecommunications conference session.

After the reception of the "TB_Granted" message 503, the second mobile radio communications terminal 103, and thus the second subscriber T2, has had the right to speak granted to it, which is symbolized by block 504 in FIG. 5.

Figure 6:
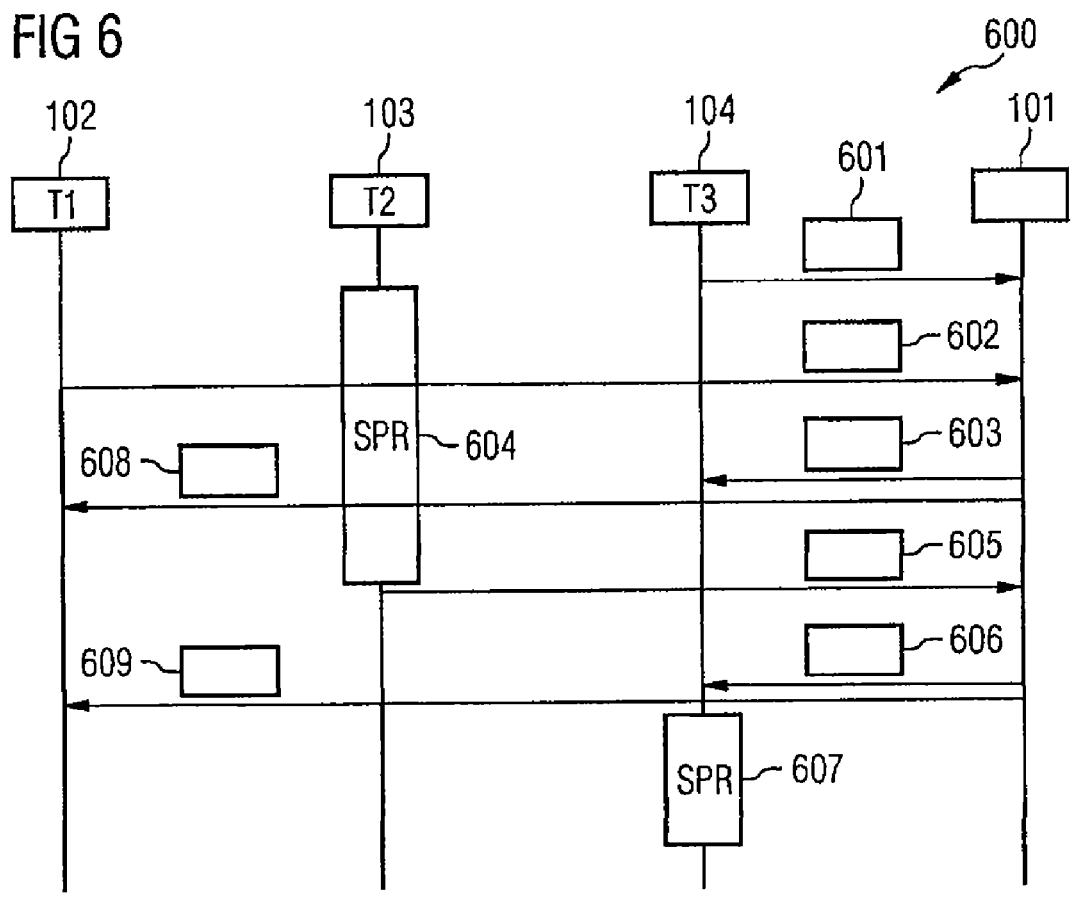
FIG. 6 is a message flowchart according to yet another exemplary embodiment of the invention.

In addition it is assumed, as is illustrated in a message flowchart 600 in FIG. 6, that the third subscriber T3 also requests the right to speak (by means of the third mobile radio communications terminal 104), and subsequently the first subscriber T1 also requests the right to speak (by means of the first mobile radio communications terminal 102). This is done by means of a third "TB_Request" message 601 which is generated by the third mobile radio communications terminal 104 and communicated to the PTT server 101 or by means of a fourth "TB_Request" message 602 which is generated by the first mobile radio communications terminal 102 and communicated to the PTT server 101.

The third mobile radio communications terminal 104, and thus the third subscriber T3, is informed by the PTT server 101, by means of a second "TB_Request_Queue_Status" message 603 which is generated by the PTT server 101 and communicated to the third mobile radio communications terminal 104, that the third mobile radio communications terminal 104 and thus the third subscriber T3 will receive the right to talk (right to speak) at the latest after the remaining talk time of the second subscriber T2. According to this exemplary embodiment of the invention, this is done by means of the time period indication of 30 seconds in the time period field of the second "TB_Request_Queue_Status" message 603. The first mobile radio communications terminal 102, and thus the first subscriber T1, is informed that the first subscriber T1 will receive the right to talk at the latest after the remaining talk time of the second subscriber T2 plus the maximum talk time of the third subscriber T3. The PTT server 101 communicates this information as a third "TB_Request_Queue_Status" message 608 to the first mobile radio communications terminal 102, with the message in the time period field containing a parameter value of 90 seconds.

The second subscriber T2 ends prematurely, i.e. before his maximum talk time has ended, his talking contribution. The second subscriber T2 communicates this to the PTT server 101 with a "TB_Release" message 605 by means of the second mobile radio communications terminal 103, the second mobile radio communications terminal 103 releasing the right 604 to speak by means of the "TB_Release" message 605 which is generated by it and communicated to the PTT server 101.

The PTT server 101 then approves the right to talk to the third subscriber T3, and thus to the third mobile radio communications terminal 104, by means of a third "TB_Granted" message 606 which is generated by the PTT server 101 and communicated to the third mobile radio communications terminal 104. The right 607 to speak is in turn allocated to the third mobile radio communications terminal 104 for 60 seconds (specified by the parameter value of 60 seconds in the time period field of the "TB_Granted" message 606).

The first mobile radio communications terminal 102, and thus the first subscriber T1, is informed, by means of a fourth "TB_Request_Queue_Status" message 609 generated by the PTT server 101 and communicated to the first mobile radio communications terminal 102, that the maximum time up to the approval of his right to talk has been reduced, to 60 seconds according to this exemplary embodiment.

In addition it is assumed that the fourth subscriber T4, i.e. according to this exemplary embodiment of the invention the user of the fourth mobile radio communications terminal 105, requests the right to talk with an increased priority (cf. message flow diagram 800 in FIG. 8). This is done by means of a fifth "TB_Request" message 801 which is generated by the fourth mobile radio communications terminal 105 and communicated to the PTT server 101. The fourth subscriber T4 and thus the fourth mobile radio communications terminal 105 receives the right to talk prematurely, but not immediately. This is communicated to the fourth subscriber T4, and thus to the fourth mobile radio communications terminal 105, by the PTT server 101 by means of a fifth "TB_Request_Queue_Status" message 802. Ten seconds is communicated as the time period up to the granting of the right to talk in the fifth "TB_Request_Queue_Status" message 802, this time indication being contained in the time period field of the "TB_Request_Queue_Status" message 802.

In addition, (for example simultaneously) the PTT server 101 generates a "TB_Revoke" message 803 and communicates it to the third mobile radio communications terminal 104, which communicates to the third mobile radio communications terminal 104 that its right to talk will be prematurely withdrawn in 10 seconds (the time parameter of 10 seconds is contained in the time period field of the "TB_Revoke" message 803 which is illustrated in FIG. 7 and described in detail below).

FIG. 7 shows the format of the RTCP message "TB_Revoke" for withdrawing the communications right with an indication of the time up to the withdrawal of the communications right.

The RTCP message "TB_Revoke" 803 has the following message fields:

a version field V 701:
   an RTP version number (according to this exemplary embodiment of the invention V=2);
a padding field P 702:
   an indicator of padding;
a subtype field 703:
   a subtype of the message, the message type "TB_Revoke" being designated by "00110";
a packet type field 704:
   an indicator of applications-defined RTCP message: according to this exemplary embodiment of the invention

PT=APP=204;

a message length field 705:
   an indication of the length of the message after the message length field in words (32 bits); if the value "4" is entered here, the message is a "TB_Revoke" message with time indication; if the field contains the value "3", it is a "TB_Revoke" message without a time indication, as is described above in the communications protocol real-time transport control protocol (RTCP) according to the OMA communications standard;
an SSRC field 706:
   a synchronization field for indicating the synchronization source of the PTT server which transmits the communications right withdrawal; the SSRC identifies the transmitter of media flows unambiguously; it is defined in the RTP packets associated with the RTCP message;
a message name field 707:
   an applications-defined message name, according to this exemplary embodiment PoC1, which designates a PTT version 1 Push-to-Talk-over-Cellular system;

a cause field 708:
  a field which contains a code which specifies the reason for which the communications right is withdrawn; possible codes are described in the communications protocol real-time transport control protocol (RTCP) according to the OMA communications standard;
an information field 709:
  the information field can contain additional information as described in the communications protocol real-time transport control protocol (RTCP) according to the OMA communications standard (this field is also referred to as "additional information" field); and
a time period field 208:
  an indication of a time period in milliseconds (alternatively in seconds, microseconds or any desired predefined time intervals, alternatively as an absolute time indication) up to the latest time when the communications right will be withdrawn.

The first mobile radio communications terminal 102, and thus the first subscriber T1, is informed, by means of a sixth "TB_Request_Queue_Status" message 804 that the maximum remaining time up to the allocation of the right to talk to it has increased (represented in this exemplary embodiment by means of a parameter value 70 in the time period field 411 of the sixth "TB_Request_Queue_Status" message 804). After the 10 seconds, the right to talk is withdrawn from the third subscriber T3 and thus from the third mobile radio communications terminal 104 (symbolized in FIG. 8 by a double arrow 805). This is no longer communicated separately to the third mobile radio communications terminal 104 and thus to the third subscriber T3 by the PTT server 101. The fourth mobile radio communications terminal 105, and thus the fourth subscriber T4, then receives the right to talk, which is communicated to the fourth mobile radio communications terminal 105 by means of a fourth "TB_Granted" message 806 which is generated by the PTT server 101 and communicated to the fourth mobile radio communications terminal 105. In this message, the maximum talk time after which the right to talk will be withdrawn again from the fourth mobile radio communications terminal 105, 60 seconds according to this exemplary embodiment of the invention, is then communicated to said fourth mobile radio communications terminal 105 as a parameter value in the time period field 208 of this message.

After reception of the fourth "TB_Granted" message 806, the fourth mobile radio communications terminal 105, and thus the fourth subscriber T4, has the right to talk (symbolized by block 807 in FIG. 8).

After its talk time has elapsed, the right to talk is withdrawn again from the fourth mobile radio communications terminal 105, and thus from the fourth subscriber T4, by the PTT server 101. This is no longer communicated separately to the fourth mobile radio communications terminal 105, and thus to the fourth subscriber T4.

Figure 9:
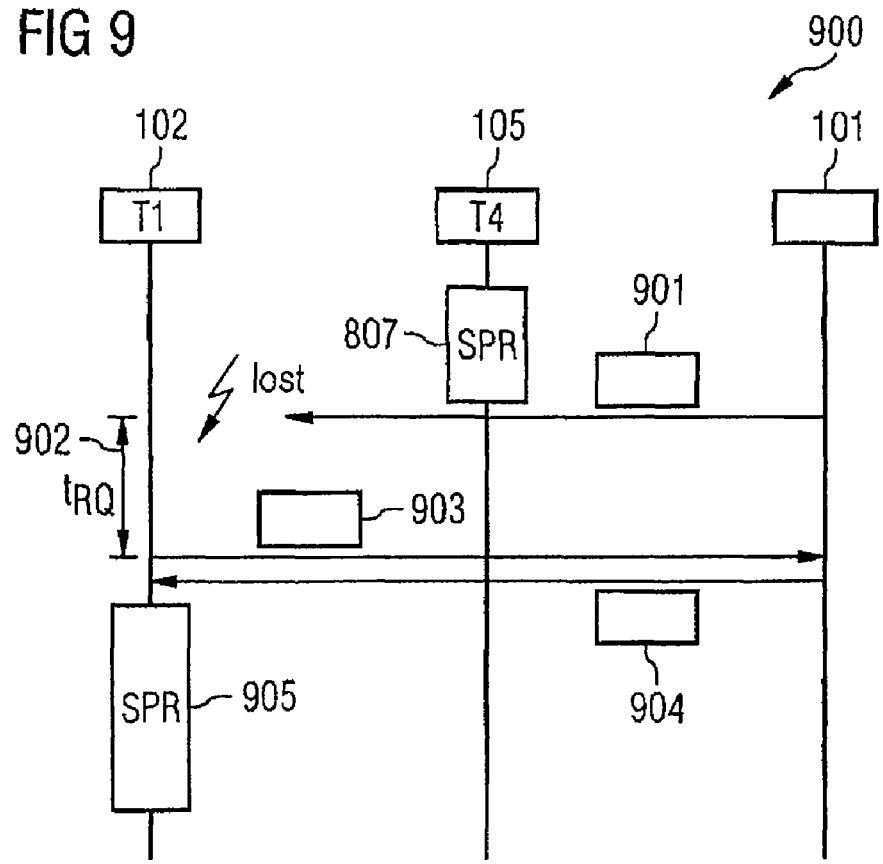
FIG. 9 is a message flowchart according to another exemplary embodiment of the invention.

The PTT server 101 then transmits a fifth "TB_Granted" message 901 (cf. message flowchart 900 in FIG. 9) to the first mobile radio communications terminal 102 and thus to the first subscriber T1, in order to allocate the right to talk to the first mobile radio communications terminal 102, and thus to the first subscriber T1.

It is now assumed that the fifth "TB_Granted" message 901 is lost on its transmission path to the first mobile radio communications terminal 102.

However, the first subscriber T1, or the first mobile radio communications terminal 102, is already informed, with the last "TB_Request_Queue_Status" message 804 to be transmitted that the right to talk has been allocated to it after the maximum talk time of the fourth subscriber T4. After a waiting time (symbolized in FIG. 9 by a double arrow 902) after the anticipated time of allocation of the right to talk, the first mobile radio communications terminal 102, and thus the first subscriber T1, therefore requests the right to talk again from the PTT server 101 with a sixth "TB_Request" message 903, which the first mobile radio communications terminal 102 generates and transmits to the PTT server 101. If the request occurs within the talk time which is provided for the first mobile radio communications terminal 102, and thus to the first subscriber T1, the PTT server 101 responds with a sixth "TB_Granted" message 904 which the PTT server 101 generates and transmits to the first mobile radio communications terminal 102, with an indication of the talk time still remaining for the first subscriber T1 (40 seconds according to this exemplary embodiment of the invention). In this case, the first subscriber T1 receives the right to talk 905.

Figure 10:
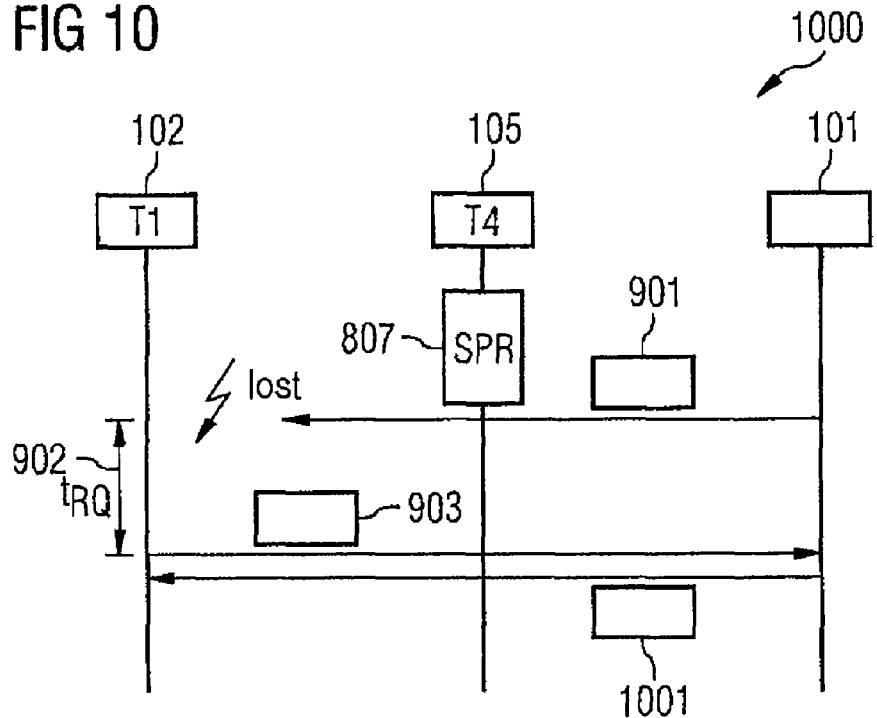
FIG. 10 is a flowchart according to a further exemplary embodiment of the invention.

If the request already occurs outside the talk time which is provided for the first subscriber T1, the PTT server 101 responds to the reception of the sixth "TB_Request" message 903 with a "TB_Deny" message 1001 (cf. message flow diagram 1000 in FIG. 10) which is generated by the PTT server 101 and transmitted to the first mobile radio communications terminal 102, in order to indicate to the first mobile radio communications terminal 102, and thus to the first subscriber T1, that the first subscriber T1 has not had the right to talk allocated to it.

In an alternative embodiment of the invention, there is provision for the maximum speech time not to be transmitted with each "TB_Granted" message or with each "TB_Revoke" message but rather only with the respective first "TB_Granted" message or first "TB_Revoke" message, and then when the value for the maximum speech time of the respective subscriber is to be changed compared to the value communicated last.

In the above examples, a time element is added to the RTCP messages "TB_Request_Queue_Status", "TB_Granted" and "TB_Revoke" defined in the communications protocol real-time transport control protocol (RTCP) according to the OMA communications standard for cases in which time indications are to be transmitted with these messages. It is also possible to provide for separate new RTCP messages to be defined for the RTCP messages "TB_Request_Queue_Status", "TB_Granted" and "TB_Revoke" with a time indication, said RTCP messages being identified, for example, by new unambiguous subtypes.

If the rules for the communications right control do not provide any maximum talk times, it is possible, in one alternative embodiment of the invention, to provide for the talk right always to be withdrawn with delay and for the subscriber to be warned about the actual withdrawal time so that the subscriber can still conclude his talking contribution.

In addition, in an alternative embodiment of the invention it is also possible to provide for the waiting times not to be transmitted automatically with a "TB_Granted" message, a "TB_Request_Queue_Status" message or a "TB_Revoke" message to the subscriber terminal, i.e. to the mobile radio communications terminal, but rather only at the special request of the subscriber terminal.

The PTT server 101 responds to the request with the last communications right command ("TB_Granted", "TB_Request_Queue_Status" or "TB_Revoke") with an indication of a corresponding time period.

Figure 11:
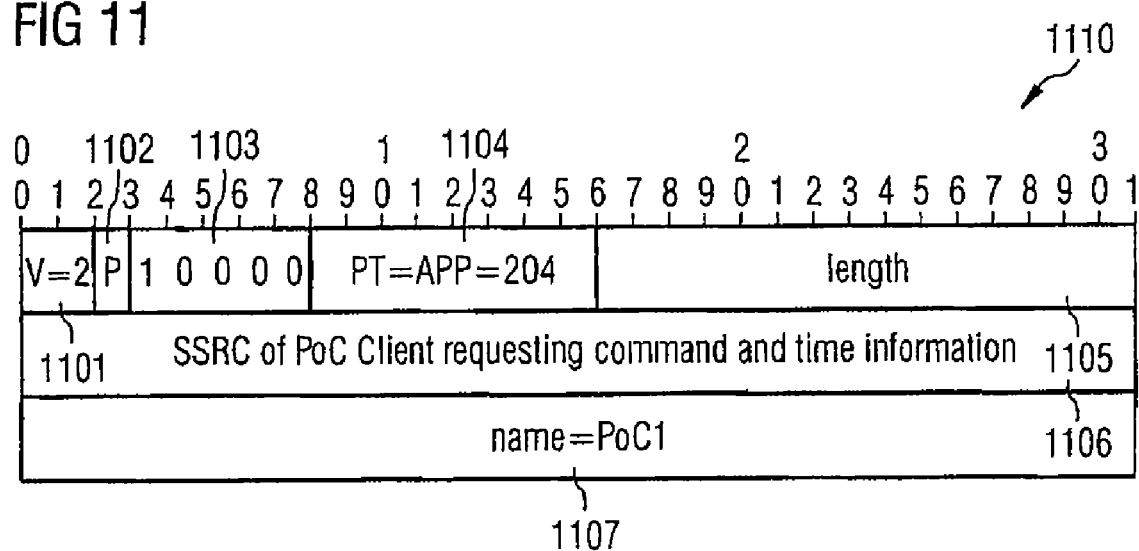
FIG. 11 shows a format of an RTCP message according to another exemplary embodiment of the invention.

FIG. 11 shows the format of an RTCP message request-message "TB_Command_With_Timer_Request" 1110 in detail. The RTCP message "TB_Command_With_Timer_Request" 1110 for requesting the last communications right command with the time indication has, according to one exemplary embodiment of the invention, the following message fields:

a version field V 1101:
   an RTP version number (according to this exemplary embodiment of the invention V=2);
a padding field P 1102:
   an indicator for padding;
a subtype message field 1103:
   a subtype of the message, "10000" specifying: "request of the last communications right command with time indication", in which case it is to be noted that this value has been used only by way of example and it is also possible to use other values for this;
a packet type field 1104:
   an indicator of an applications-defined RTCP message, according to this exemplary embodiment of the invention

PT=APP=204;

a message length field 1105:
   an indication of the length of the message according to the message length field in words (32 bits);
an SSRC field 1106:
   a synchronization source of the subscriber terminal which requests the last command; the SSRC identifies the transmitter of media flows unambiguously; it is defined in the RTP packets associated with the RTCP message;
a message name field 1107:
   an applications-defined message name, according to this exemplary embodiment of the invention PoC1, which designates a version 1 Push-to-Talk-over-Cellular system.

The waiting times can also be transmitted in addition to the automated queuing time communications (by means of "TB_Granted" message, "TB_Request_Queue_Status" message or "TB_Revoke" message) to the subscriber terminal on request with the message format shown in FIG. 11.

The queuing time communications per "TB_Granted" message, "TB_Request_Queue_Status" message or "TB_Revoke" message and the queuing time requests per "TB_Command_With_Timer_Request" message can also be transmitted by means of communications protocols for communications right control other than the RTCP according to the exemplary embodiments described above, for example by means of BFCP or SIP.

It is to be noted that the invention can also be used in other conference systems and not only in Push-to-Talk conference systems or Push-to-Talk-over-Cellular conference systems for transmitting audio data but also in systems for transmitting other data, in particular media data, for example video data, still image data, textual data etc.

The invention is not restricted to a PTT conference system but rather can also be used in other systems with communications right control, for example in Internet-based conference systems, generally any conference systems with communications right control.

Figure 12:
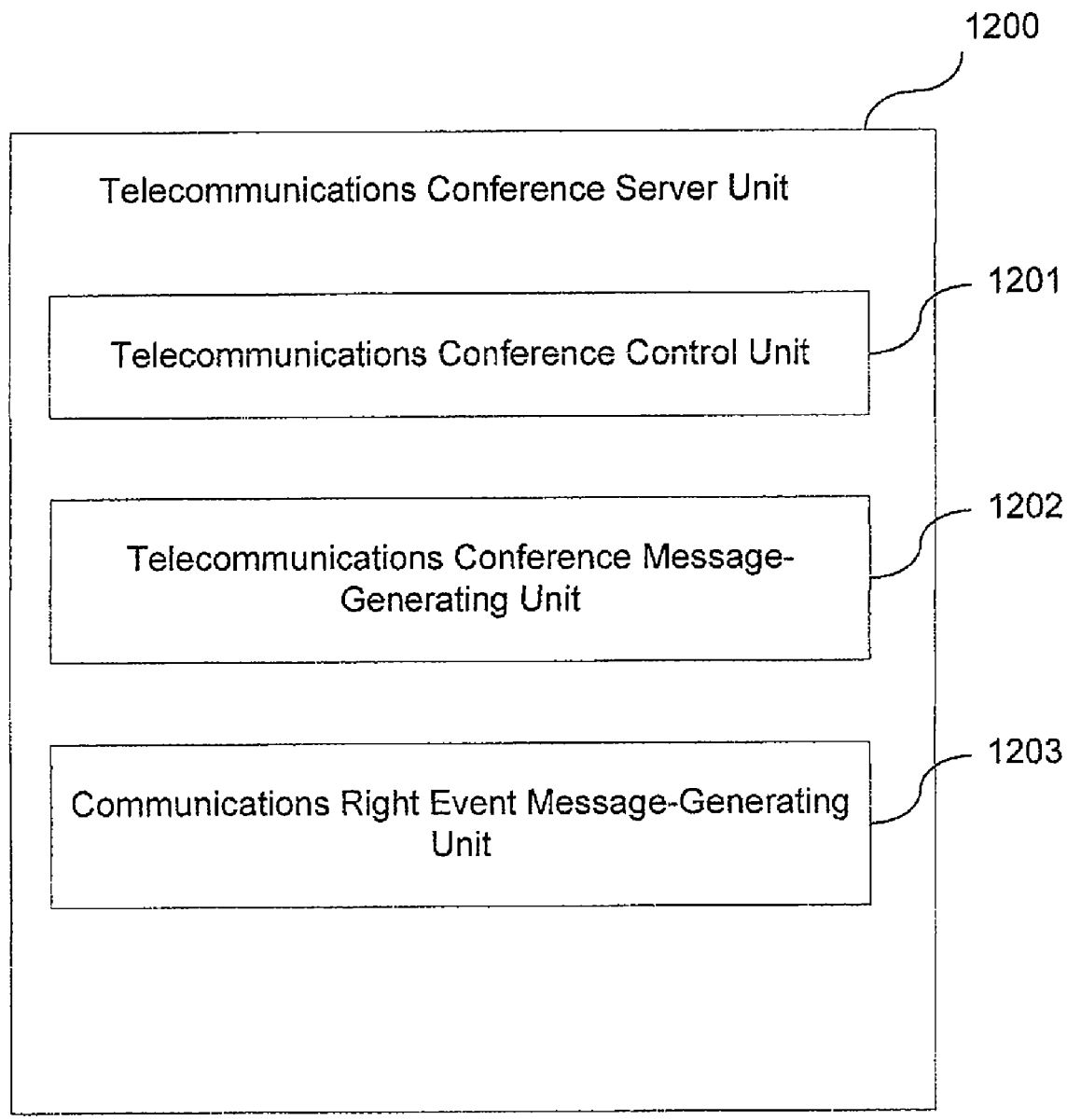
FIG. 12 shows a telecommunications conference server unit according to one embodiment of the invention.

FIG. 12 shows a telecommunications conference server unit 1200 according to one embodiment of the invention. The telecommunications conference server unit 1200 includes a telecommunications conference control unit 1201 performing server control of a telecommunications conference and a telecommunications conference control message-generating unit 1202 generating at least one telecommunications conference control message and adding communications right allocation information to the telecommunications conference control message. The communications right allocation information specifies an event on whose occurrence a communications right is withdrawn from or allocated to a telecommunications terminal within the scope of the telecommunications conference.

The telecommunications conference server unit 1200 may further include a communications right event message-generating unit 1203 generating at least one telecommunications conference event message in which the event which serves as the basis for the withdrawal or allocation of the communications right is specified.

Figure 13:
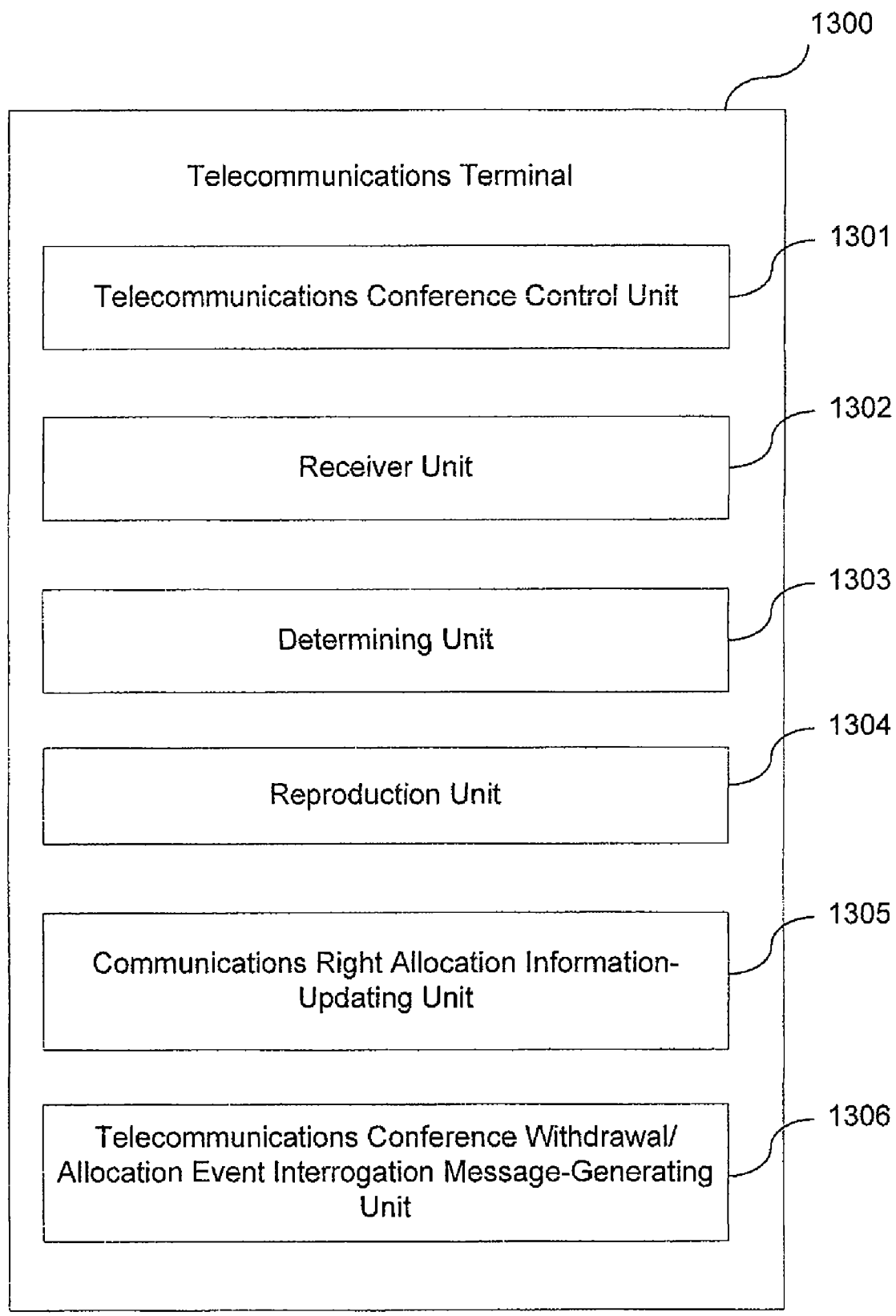
FIG. 13 shows a telecommunications terminal according to one embodiment of the invention.

FIG. 13 shows a telecommunications terminal 1300 according to one embodiment of the invention. The telecommunications terminal 1300 includes a telecommunications conference control unit 1301 performing terminal control of a telecommunications conference, a receiver unit 1302 receiving at least one telecommunications conference control message, and a determining unit 1303 determining communications right allocation information from the at least one telecommunications conference control message. The communications right allocation information specifies an event on whose occurrence a communications right is withdrawn from or allocated to the telecommunications terminal 1300 within the scope of the telecommunications conference.

The telecommunications terminal 1300 may further include a reproduction unit 1304 reproducing for a user the communications right allocation information which is determined, a communications right allocation information-updating unit 1305 updating communications right allocation information as a function of a received telecommunications conference control message, and a telecommunications conference withdrawal/allocation event interrogation message-generating unit 1306 generating at least one telecommunications conference withdrawal/allocation event interrogation message for interrogating the withdrawal event or the allocation event.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined soley by the claimed appended hereto.

What is claimed is:

1. A telecommunications conference server, comprising:
   a telecommunications conference controller configured to perform server control of a telecommunications conference; and
   a telecommunications conference control message-generator configured to generate at least one telecommunications conference control message and add communications right allocation information including queuing information about communications right allocation concerning the telecommunications conference to the telecommunications conference control message,
   wherein the communications right allocation information specifies an event on whose occurrence a communications right will be withdrawn from or allocated to a telecommunications terminal within the scope of the telecommunications conference using the queuing information about the communications right allocation within the telecommunications conference, and wherein the telecommunications conference control message-generator is further configured to add, as communications right allocation information, information which specifies a time period after which a communications right will be withdrawn from or allocated to the telecommunications terminal within the scope of the telecommunications conference using the queuing information about the communications right allocation within the telecommunications conference.

2. The telecommunications conference server of claim 1, wherein the telecommunications conference control message-generator is configured to add right to speak allocation information to the telecommunications conference control message, the right to speak allocation information specifying the event on whose occurrence a right to speak will be withdrawn from or allocated to the telecommunications terminal within the scope of the telecommunications conference using the queuing information about the communications right allocation within the telecommunications conference.

3. The telecommunications conference server of claim 1, wherein the telecommunications conference controller is configurted to perform server control of a half-duplex telecommunications conference.

4. The telecommunications conference server of claim 1, wherein the telecommunications conference controller is configured to perform server control of an Internet-based telecommunications conference.

5. The telecommunications conference server unit of claim 1, wherein the telecommunications conference controller is configured to perform server control of a push-to-talk telecommunications conference.

6. The telecommunications conference server of claim 5, wherein the telecommunications conference controller is configured to perform server control of a push-to-talk-over-cellular telecommunications conference.

7. The telecommunications conference server of claim 1, wherein the telecommunications conference control message generator is configured to generate the at least one telecommunications conference control message according to a telecommunications conference control protocol.

8. The telecommunications server of claim 7, wherein the telecommunications conference control message generator is configured to generate the at least one telecommunications conference control message according to a telecommunications conference control protocol selected from the group consisting of Session Initiation Protocol, Real Time Transport Control Protocol, and Binary Floor Control Protocol.

9. The telecommunications conference server unit of claim 1, wherein the telecommunications conference controller is configured to carry out the withdrawal or the allocation of a communications right implicitly by means of the telecommunications conference control message by the communications right being withdrawn or allocated when the event specified by the communications right allocation information contained in the telecommunications conference control message has occurred.

10. The telecommunications conference server unit of claim 1, wherein the telecommunications conference control message generator is configured to receive at least one telecommunications conference withdrawal/allocation event interrogation message interrogating the withdrawal event or the allocation event.

11. The telecommunications conference server of claim 1, further comprising a communications right event message generator configured to generate at least one telecommunications conference event message in which the event which serves as the basis for the withdrawal or allocation of the communications right is specified.

12. The telecommunications conference server unit of claim 11, wherein the communications right event message generator is configured to generate the telecommunications conference event message according to a telecommunications conference control protocol selected from the group consisting of Session Initiation Protocol, Real Time Transport Control Protocol, and Binary Floor Control Protocol.

13. The telecommunications conference server of claim 11, wherein the telecommunications right event message is at least one message selected from the group consisting of:
a message with which the communications right is granted,
a message with which the communications right is withdrawn, and
a message with which status information about the status of a communications right assignment queue is conveyed.

14. A telecommunications terminal, comprising:
a telecommunications conference controller configured to perform terminal control of a telecommunications conference;
a receiver configured to receive at least one telecommunications conference control message; and
a determiner configured to determine communications right allocation information from the at least one telecommunications conference control message, the communications right allocation information including queuing information about communications right allocation concerning the telecommunications conference and specifying an event on whose occurrence a communications right is withdrawn from or allocated to the telecommunications terminal within the scope of the telecommunications conference using the queuing information about communications right allocation within the telecommunications conference,
wherein the telecommunications conference control message further includes, as communications right allocation information, information which specifies a time period after which a communications right will be withdrawn from or allocated to the telecommunications terminal within the scope of the telecommunications conference using the queuing information about the communications right allocation within the telecommunications conference.

15. The telecommunications terminal of claim 14, wherein the determiner is configured to determine communications right allocation information from the at least one telecommunications conference control message, the communications right allocation information specifying a time period after which a communications right will be withdrawn from or allocated to the telecommunications terminal within the scope of the telecommunications conference using the queuing information about communications right allocation within the telecommunications conference.

16. The telecommunications terminal of claim 14, further comprising a reproducer configured to reproduce for a user the communications right allocation information which is determined.

17. The telecommunications terminal of claim 16, wherein the reproducer comprises a display.

18. The telecommunications terminal of claim 14, wherein the telecommunications conference controller is configured to perform terminal control of a half-duplex telecommunications conference.

19. The telecommunications terminal of claim 14, wherein the telecommunications conference controller is configured to perform terminal control of an Internet-based telecommunications conference.

20. The telecommunications terminal of claim 14, wherein the telecommunications conference controller is configured to perform terminal control of a push-to-talk telecommunications conference.

21. The telecommunications terminal of claim 20, wherein the telecommunications conference controller is configured to perform terminal control of a push-to-talk-over-cellular telecommunications conference.

22. The telecommunications terminal of claim 14, wherein the telecommunications conference controller is configured to carry out the withdrawal or the allocation of a communications right such that it occurs automatically if the event specified by the communications right allocation information contained in the telecommunications conference control message has occurred.

23. The telecommunications terminal of claim 14, wherein the determiner is configured to determine communications right allocation information from the at least one telecommunications conference control message according to a telecommunications conference control protocol.

24. The telecommunications terminal of claim 23, wherein the determiner is configured to determine communications right allocation information from the at least one telecommunications conference control message according to a telecommunications conference control protocol selected from the group consisting of Session Initiation Protocol, Real Time Transport Control Protocol, and Binary Floor Control Protocol.

25. The telecommunications terminal of claim 14, further comprising a communications right allocation information updater configured to update communications right allocation information as a function of a received telecommunications conference control message.

26. The telecommunications terminal of claim 14, further comprising a telecommunications conference withdrawal/allocation event interrogation message-generator configured to generate at least one telecommunications conference withdrawal/allocation event interrogation message for interrogating the withdrawal event or the allocation event.

27. A method of generating a telecommunications conference control message, comprising:
adding control information controlling a telecommunications conference to the telecommunications conference control message; and
adding communications right allocation information including queuing information about communications right allocation concerning the telecommunications conference to the telecommunications conference control message, the communications right allocation information specifying an event on whose occurrence a communications right will be withdrawn from or allocated to a telecommunications terminal within the scope of the telecommunications conference using the queuing information about communications right allocation within the telecommunications conference,
further adding, as communications right allocation information, information which specifies a time period after which a communications right will be withdrawn from or allocated to the telecommunications terminal within the scope of the telecommunications conference using the queuing information about the communications right allocation within the telecommunications conference.

28. The method of claim 27, further comprising receiving at least one telecommunications conference withdrawal/allocation event interrogation message interrogating the withdrawal event or the allocation event.

29. The method of claim 27, further comprising specifying, in at least one telecommunications conference event message, the event which served as the basis for the withdrawal or allocation of the communications right.

30. The method of claim 29, further comprising transmitting the at least one telecommunications conference event message to a telecommunications terminal.

31. A method of controlling a telecommunications conference, comprising:
determining control information controlling a telecommunications conference and communications right allocation information from a telecommunications conference control message being received within the scope of a telecommunications conference, the telecommunications right allocation information including queuing information about communications right allocation concerning the telecommunications conference and specifying an event on whose occurrence a communications right will be withdrawn from or allocated to a telecommunications terminal within the scope of the telecommunications conference using the queuing information about communications right allocation within the telecommunications conference,
wherein the telecommunications conference control message further includes, as communications right allocation information, information which specifies a time period after which a communications right will be withdrawn from or allocated to the telecommunications terminal within the scope of the telecommunications conference using the queuing information about the communications right allocation within the telecommunications conference; and
controlling the telecommunications conference according to the control information.

32. The method of claim 31, further comprising reproducing the communications right allocation information for a user.

33. The method of claim 31, further comprising generating at least one telecommunications conference withdrawal/allocation event interrogation message interrogating the withdrawal event or the allocation event.

34. The method of claim 33, further comprising transmitting the at least one telecommunications conference withdrawal/allocation event interrogation message to a telecommunications conference server.

35. A computer-readable memory element comprising a computer program of controlling a telecommunications conference, the computer-readable memory element element, when being executed by a processor, comprising:
adding control information controlling a telecommunications conference to a telecommunications conference control message; and
adding a communications right allocation message to the telecommunications conference control message, the communications right allocation information including queuing information about communications right allocation concerning the telecommunications conference and specifying an event on whose occurrence a communications right will be withdrawn from or allocated to a telecommunications terminal within the scope of the telecommunications conference using the queuing information about communications right allocation within the telecommunications conference, wherein the telecommunications conference control message further/additionally includes, as communications right allocation information, information which specifies a time period after which a communications right will be withdrawn from or allocated to the telecommunications terminal within the scope of the telecommunications conference using the queuing information about the communications right allocation within the telecommunications conference.

36. A computer-readable storage medium comprising a computer program for controlling a telecommunications conference, the computer program, when being executed by a processor, comprising:

determining control information controlling the telecommunications conference and communications right allocation information from a telecommunications conference control message being received within the scope of a telecommunications conference, the communications right allocation information including queuing information about communications right allocation concerning the telecommunications conference and specifying an event on whose occurrence a communications right will be withdrawn from or allocated to a telecommunications terminal within the scope of the telecommunications conference using the queuing information about communications right allocation within the telecommunications conference, wherein the telecommunications conference control message further includes, as communications right allocation information, information which specifies a time period after which a communications right will be withdrawn from or allocated to the telecommunications terminal within the scope of the telecommunications conference using the queuing information about the communications right allocation within the telecommunications conference.

37. A computer program element of generating a telecommunications conference control message, the computer program element, when being executed by a processor, comprising:

adding control information controlling a telecommunications conference to the telecommunications conference control message; and adding communications right allocation information to the telecommunications conference control message, the communications right allocation information including queuing information about communications right allocation concerning the telecommunications conference and specifying an event on whose occurrence a communications right will be withdrawn from or allocated to a telecommunications terminal within the scope of the telecommunications conference using the queuing information about communications right allocation within the telecommunications conference, further adding, as communications right allocation information, information which specifies a time period after which a communications right will be withdrawn from or allocated to the telecommunications terminal within the scope of the telecommunications conference using the queuing information about the communications right allocation within the telecommunications conference.

38. A computer program element of controlling a telecommunications conference, the computer program element, when being executed by a processor, comprising:

determining control information controlling a telecommunications conference and communications right allocation information from a telecommunications conference control message received within the scope of a telecommunications conference, the communications right allocation information including queuing information about communications right allocation concerning the telecommunications conference and specifying an event on whose occurrence a communications right will be withdrawn from or allocated to a telecommunications terminal within the scope of the telecommunications conference using the queuing information about communications right allocation within the telecommunications conference, wherein the telecommunications conference control message further includes, as communications right allocation information, information which specifies a time period after which a communications right will be withdrawn from or allocated to the telecommunications terminal within the scope of the telecommunications conference using the queuing information about the communications right allocation within the telecommunications conference; and controlling the telecommunications conference using the control information which is determined.

39. A telecommunications conference server, comprising:

a telecommunications conference control means for performing server control of a telecommunications conference; and a telecommunications conference control message-generating means for generating at least one telecommunications conference control message and adding communications right allocation information including queuing information about communications right allocation concerning the telecommunications conference to the telecommunications conference control message, wherein the communications right allocation information specifies an event on whose occurrence a communications right will be withdrawn from or allocated to a telecommunications terminal within the scope of the telecommunications conference using the queuing information about communications right allocation within the telecommunications conference, wherein the telecommunications conference control message-generating means is further configured to add, as communications right allocation information, information which specifies a time period after which a communications right will be withdrawn from or allocated to the telecommunications terminal within the scope of the telecommunications conference using the queuing information about the communications right allocation within the telecommunications conference.

40. A telecommunications terminal, comprising:

a telecommunications conference control means for performing terminal control of a telecommunications conference;

a receiver means for receiving at least one telecommunications conference control message; and a determining means for determining communications right allocation information from the at least one telecommunications conference control message, the communications right allocation information including queuing information about communications right allocation concerning the telecommunications conference and specifying an event on whose occurrence a communications right will be withdrawn from or allocated to the telecommunications terminal within the scope of the telecommunications conference using the queuing information about communications right allocation within the telecommunications conference, wherein the telecommunications conference control message further includes, as communications right allocation information information which specifies a time period after which a communications right will be withdrawn from or allocated to the telecommunications terminal within the scope of the telecommunications conference using the queuing information about the communications right allocation within the telecommunications conference.

* * * * *